United States Patent [19]
Mueller et al.

[11] 3,978,903
[45] Sept. 7, 1976

[54] TUBELESS TIRE BEAD SEATER

[75] Inventors: John L. Mueller, Detroit; Henry M. Reichert, Roseville, both of Mich.

[73] Assignee: Sparton Corporation, Jackson, Mich.

[22] Filed: Apr. 24, 1975

[21] Appl. No.: 571,359

[52] U.S. Cl. ................................ 157/1.2; 157/1.26
[51] Int. Cl.² ................... B60C 25/06; B60C 25/08
[58] Field of Search .................... 157/1.1, 1.2, 1.26

[56] References Cited
UNITED STATES PATENTS

| | | | |
|---|---|---|---|
| 2,900,015 | 8/1959 | Harrison | 157/1.1 |
| 3,853,165 | 12/1974 | Collmann | 157/1.2 |

*Primary Examiner*—Al Lawrence Smith
*Assistant Examiner*—James G. Smith
*Attorney, Agent, or Firm*—Beaman & Beaman

[57] ABSTRACT

Apparatus for seating and inflating tubeless tires, particularly tubeless tires of large sizes, wherein a wheel having a tubeless tire placed thereon is elevated into engagement with an annular wheel rim seal ring and a tire sidewall seal ring and held by a predetermined force. The sidewall seal ring maintains a separation between the upper tire bead and upper wheel rim, and an annular chamber defined between the seal rings is pressurized with air permitting air to enter the tubeless tire between the upper tire bead and wheel. The pressures exerted upon the sidewall seal ring during inflation are sufficient to lower the wheel and tire permitting seating of the tire bead and wheel rim. Lost motion means support the wheel rim seal ring so that sealing thereof with the wheel rim is maintained during lowering of the wheel and tire under inflation forces, and the seal rings are mounted for vertical adjustment to permit ready accommodation of the apparatus to various sizes of wheels and tires.

8 Claims, 3 Drawing Figures

TUBELESS TIRE BEAD SEATER

BACKGROUND OF THE INVENTION

The invention pertains to high production bead seating and inflation apparatus for tubeless tires.

The seating and inflation of pneumatic tires on a high production basis has necessitated the development of specialized equipment for this purpose, and various types of apparatus have been proposed to accomplish bead seating and inflation in a minimum of time, and with a minimum of supervision and manual operations. Accordingly, a number of devices have been produced for seating and inflating tubeless tires on their associated wheel wherein such operations may be accomplished automatically without direct supervision.

In order to achieve high production bead seating and inflation it has been recognized that the introduction of air into the tire by means other than through the valve stem located in the wheel would substantially reduce the duration required for inflation. Accordingly, devices are known wherein inflation of the tire occurs prior to seating of one tire bead with its associated wheel rim, and devices of this type are shown, for instance, in U.S. Pat. Nos. 2,779,397; 3,461,938 and 3,528,474. However, difficulty has been experienced with devices disclosed in the aforementioned patents in maintaining adequate sealing between the apparatus and the wheel and tire over extended periods of time due to wear of the sealing surfaces and edges resulting in inconsistent inflation and an excessive use of compressed air.

In the applicants' prior U.S. Pat. No. 3,461,938, a piston is lowered to sealingly engage the upper rim of a wheel upon which a tubeless tire had been placed. The piston is supported by vertically movable apparatus wherein the wheel rim is contacted while on a conveyor, and at a station wherein wheel movement ceased. A cylinder mounted upon the same support as the piston includes a lower edge which engages the upper sidewall of the tubeless tire, and is spring biased downwardly with sufficient force to unseat the upper sidewall and upper bead from the upper wheel rim to maintain spacing therebetween. Compressed air introduced between the upper tire bead and wheel rim inflates the tubeless tire, and during the final stages of inflation the cylinder is moved upwardly by the pressure within the tire permitting the bead to seat on the wheel rim.

The aforementioned apparatus of the applicant, while performing satisfactorily, requires periodic replacement of the sealing means upon the piston and cylinder, and this apparatus had limitations with respect to its use with large sizes of tubeless tires, such as truck tires.

SUMMARY OF THE INVENTION

It is an object of the invention to provide an approved tubeless tire bead seating and inflation apparatus wherein improved wear life of the components of the apparatus is achieved, the apparatus is capable of utilization within a conveyor system, and may be readily employed with the larger sizes of tubeless tires and wheels.

In the practice of the invention a wheel having a tubeless tire preliminarily placed thereon is supported upon a conveyor and passes under a bead seating and inflation station. At such station the wheel and tire is elevated, at a predetermined force, into engagement with seal supporting means vertically positioned above the conveyor.

The seal supporting means includes a tire sidewall seal ring fixed with respect to the seal support having a lower annular end which engages the upper tire sidewall and deflects the upper tire bead downwardly. The seal support means also includes an annular wheel rim seal ring which sealingly engages the upper wheel rim, and an annular chamber is defined intermediate the two seal rings. Lost motion means support the wheel rim seal ring upon the seal support means and springs bias the same downwardly to maintain a sealing engagement with the wheel rim during limited relative movement between the wheel rim seal and the seal support means.

Compressed air is introduced into the annular chamber and the air passes around the separated tire bead and upper wheel rim into the tire body. As the pressure within the tire increases, the forces exerted on the upper tire sidewall radially outward of the sidewall seal ring produce a down force on the wheel and tire elevating structure overcoming the elevating force thereof causing the wheel and tire to lower, and the tire bead and wheel rim to seat. During such lowering of the tire and wheel rim the lost motion means supporting the wheel rim seal ring maintains the sealed engagement between this ring and the upper wheel rim. The wheel elevating means is then fully lowered to replace the inflated tire and wheel upon the conveyor.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
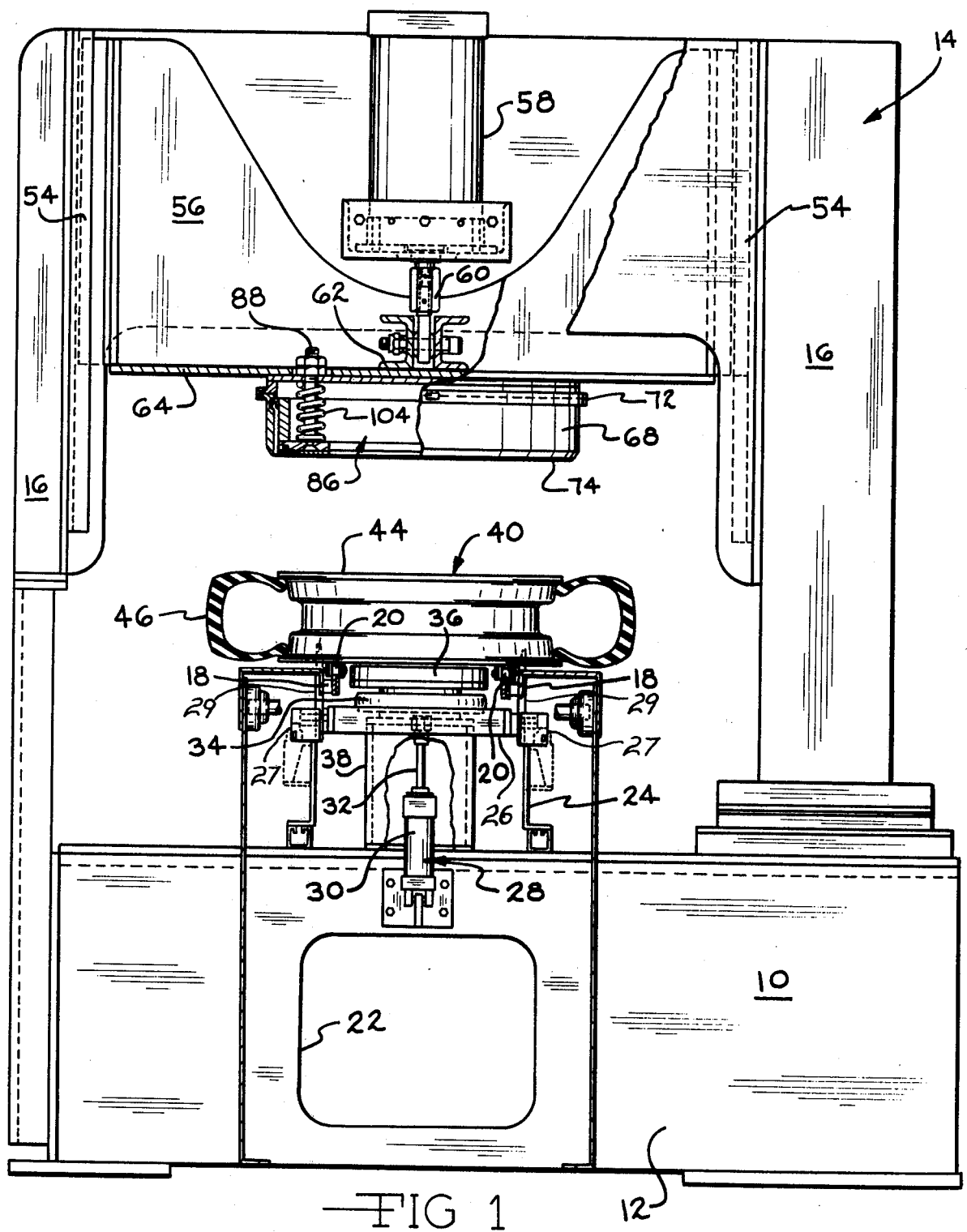
FIG. 1 is an elevational view, partially in section, of tubeless tire bead seating and inflation apparatus in accord with the invention illustrating the wheel on the conveyor.

FIG. 1 illustrates the bead seating and tire inflation station of a conveyor system. The conveyor system itself forms no part of the instant invention, and may be incorporated into the general type of tire handling system illustrated in the applicants' prior U.S. Pat. No. 3,461,938.

The station includes a frame 10 having a lower region 12 and an upper region 14. The upper region includes a pair of spaced columns 16 vertically extending from the lower region providing a clearance through which the conveyor system extends. The conveyor apparatus includes guide supports 18 upon which the spaced linked chain like elements 20 are movably supported. The return portion of the conveyor may extend through the frame opening 22, and is not shown in FIG. 1 in that the same is of a conventional nature forming no part of the instant invention. The conveyor structure also includes box elements 24 which guides vertically movable bracket 26 on which limit switches 27 are mounted. Each limit switch is operated by a locating pin 29 and the bracket 26, limit switches and pins 29 are raised and lowered by an expansible motor 28 including a cylinder 30 and piston 32.

The wheel and tire elevating mechanism comprises an expansible motor air bag 34, of conventional construction, such as Air Stroke Actuator No. 15 manufactured by Firestone Industrial Rubber Products Company of Nobelsville, Ind., supported by the column 38.

Expansible motor air bag 34 is connected to a compressed air supply by conduits and valves, not shown, controlled by switches 27 and serves to raise the wheel engaging platform 36. Suitable guide means, not shown, are associated with the wheel and tire elevating apparatus to assure vertical movement of the platform 36 during inflation of the air bag 34.

The wheel 40 conveyed on the conveyor elements 20 includes a lower rim 42, and an upper rim 44, and the platform 36 is of such dimension in the length of the conveyor as to extend below the entire lower rim 42 for raising the wheel. The tubeless tire 46 preliminarily mounted upon the wheel 40 includes a lower bead 48, an upper bead 50, and an upper sidewall 52 and, prior to the wheel and tire arriving at the bead seating and inflation station the tubeless tire 46 has been placed upon the wheel such that both beads are within the confines of the wheel rims.

Vertically extending guides 54 are defined upon the columns 16, and these guides position the seal support carriage 56 for vertical positioning on the frame 10 and columns. The vertical position of the seal support carriage 56 is determined by the expansible chamber motor 58 fixedly mounted with respect to the frame 10 and including a piston 60 attached to the seal support carriage by bracket 62. The purpose of the expansible motor 58, which may be air or oil operated, is to position the seal support carriage 56 with respect to the conveyor for accommodation of various sizes of wheels and tires. Once the seal support carriage is positioned for a particular size of wheel and tire, vertical adjustment of the carriage does not occur between the inflation and seating of tires of the same size.

The seal support carriage 56 includes a lower support plate 64 to which the seal ring base plate 66 is removably affixed by bolts, not shown. The plate 66 serves as a support for the annular sidewall seal ring 68 which is of a cylindrical configuration and attached to mounting ring 70, affixed to plate 66, by a clamping ring 72. The sidewall seal ring 68 extends downwardly from the seal support carriage plate 64 having a lower free edge 74 which is beveled at 76 to define a relatively limited area lower edge for engagement with the tire sidewall 52. An annular seal 78 is located within a recess 80 defined in the seal ring 68, and a large capacity pressurized air fitting 82 supplied by conduit 84 is mounted in the wall of the seal ring extending therethrough for providing pressurized air for inflation purposes, as will be described.

An annular wheel rim seal ring 86 is mounted within the sidewall seal ring 68, and is supported upon the seal carriage 56 in a lost motion manner by hanger pins 88 extending through holes 90 defined in base plate 66. The seal ring 86 includes a cylindrical wall 92, having an exterior surface which sealingly cooperates with the seal 78, and an annular seal pad 94 is attached to the lower edge of the wall 92 having a resilient seal 96 fixed thereon. The lower end of the hanger pins 88 attaches by screws 98 to the pad 94, and abutment nuts 100 threaded upon the upper threaded ends of the hanger pins will engage the plate 66 to limit vertical movement of the seal ring 86 in a downward direction with respect to the seal support plate 64. As will be appreciated from FIGS. 2 and 3, the holes 102 defined in the seal support plate 64 are large enough to accommodate the abutment nuts 100 such that the assembly of the base plate 66 and seal rings 68 and 86 may be removed from the seal support carriage 56 as a unit.

Figure 3:
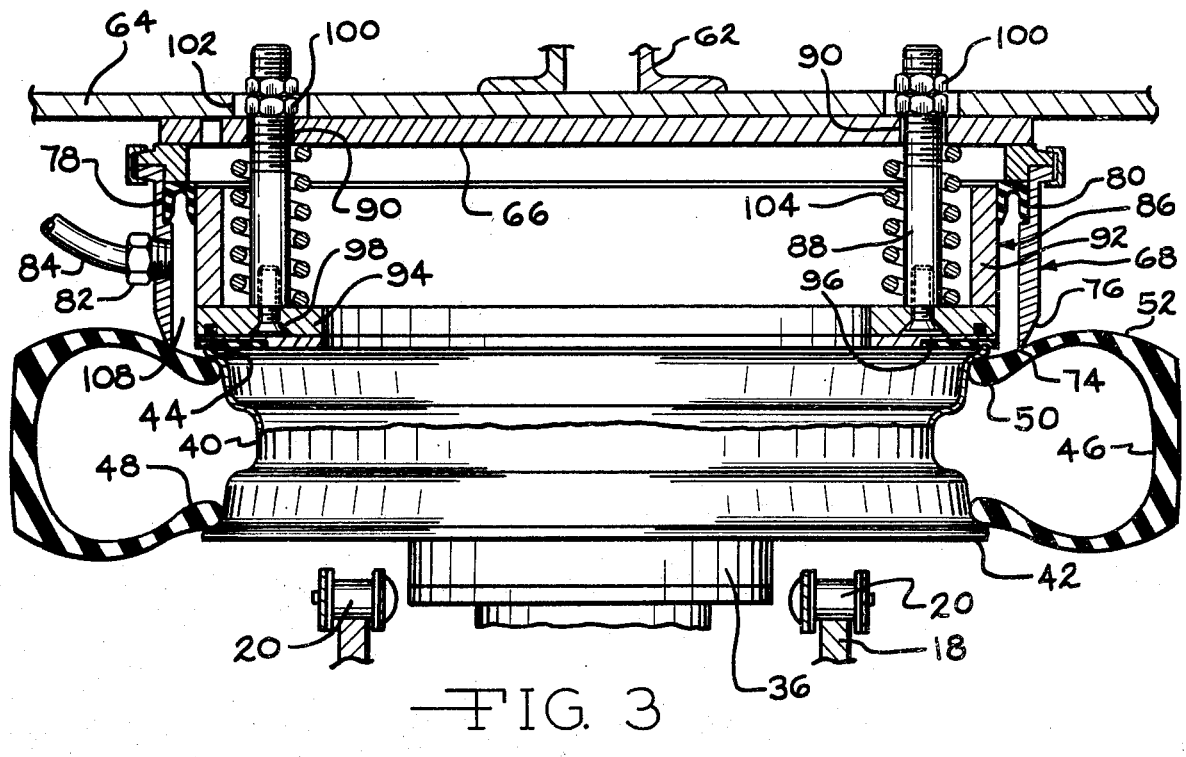
FIG. 3 is a view similar to FIG. 2 illustrating the relationship of the components at the completion of tire inflation after the initial lowering of the tire, and prior to fully lowering of the tire and wheel.

Compression springs 104 circumscribe the hanger pins 88 and are interposed between plate 66 and seal ring pad 94 biasing the seal ring 86 downwardly until the nuts 100 engage with the upper edge of the plate 66, as shown in FIG. 3. In its normal condition, the seal ring 86 will be as shown in FIG. 3, in its lowermost position with respect to the plate 66, due to the biasing of the springs 104.

In operation, the seal support carriage 56 is vertically positioned with respect to the frame 10, and conveyor elements 20, so as to locate the seal rings 68 and 86 to accommodate the particular size of wheel and tire to be seated and inflated. It is possible to intermix various sizes of wheels upon the conveyor, and by suitable sensing or programming means, not shown, the seal support carriage 56 may be vertically positioned as desired for each wheel and tire. Of course, the usual practice is to inflate a plurality of tires of the same size in batches, and in the usual practice the seal support carriage need not be vertically adjusted between adjacent bead seating and inflation cycles.

When the wheel 40 and supported tire 46 are located at the bead seating and inflation station, its presence thereat will be sensed by a senser, not shown, and the motor 28 is elevated so that pins 29 enter the wheel and accurately stop the wheel when aligned with rings 68 and 86. The wheel is elevated by means of the wheel support platform 36 which is lifted by the air bag 34 which is energized by the actuation of switches 27 when both pins 29 are engaged by the wheel. The amount of air pressure within the air bag 34 is sufficient to support the weight of the wheel and tire, but the air pressure within the bag is closely controlled so that the air bag may be compressed by the reacting force produced thereon during inflation, as described below.

Figure 2:
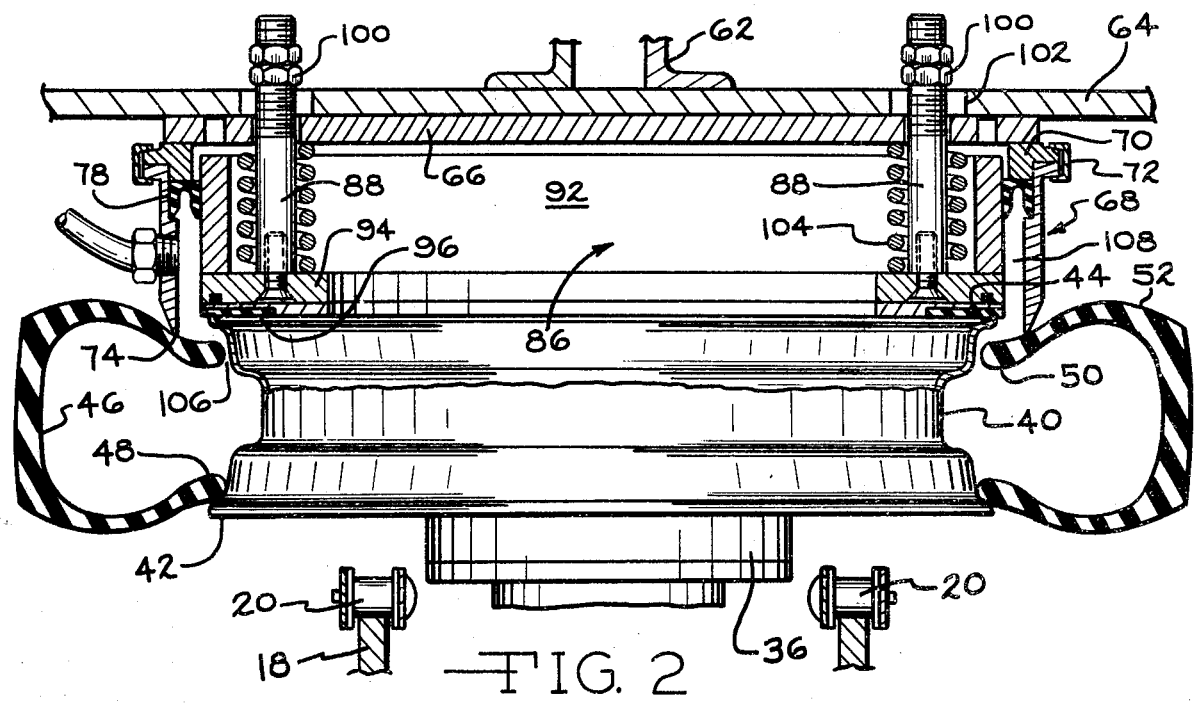
FIG. 2 is an enlarged, sectional view of the tire and wheel illustrated in the fully elevated position and during initial tire inflation.

Elevation of the wheel and tire is approximately 4 inches above the conveyor elements 20, as shown in FIG. 2, and such elevation causes the edge of the upper wheel rim 44 to engage the resilient seal 96, and lift the wheel rim seal ring 86 from its normal position against the biasing forces of the springs 104. As the springs 104 maintain a downward force on the seal ring 86, an effective sealed engagement now exists between the seal ring 86 and the wheel rim 44. Of course, the seal support carriage 56 is preliminarily positioned such that at the maximum elevation of the wheel 40 the seal ring wall 92 does not engage the lower surface of the base plate 66.

The vertical dimension of the sidewall seal ring 68 is such that when the wheel 40 is elevated to its maximum extent, FIG. 2, the lower edge 74 of the seal ring engages the tire sidewall 52 and displaces the same downwardly to provide a gap 106 between the upper bead 50 and the upper wheel rim 44. This downward force on the tire will normally insure a seating of the lower bead 48 with the wheel rim 42, and sufficient resistance to tire sidewall deflection is present to provide an effective sealed relationship between the seal ring edge 74 and the tire sidewall 52 without requiring a resilient seal or lip on the seal ring.

With the components in the relationship as shown in FIG. 2, compressed air is rapidly supplied to the annular chamber 108 defined between the seal rings 68 and 86 through conduit 84 and fitting 82. This compressed air enters the tire 46 inflating the same. As the internal pressures within the tire build up, a vertical force is applied to the seal ring 68 due to the fact that the tire sidewall radially located "outside" of the seal ring 68 is exposed to atmospheric pressure, and thus a downward force is exerted on the tire, wheel and platform 36.

By predetermining the air pressure within the air bag 34 the wheel and tire supporting force of the air bag is less than the force exerted downwardly on the wheel, tire and platform at the latter stages of inflation, and the wheel and tire will be forced downwardly by this tire inflation air pressure to a position which is shown in FIG. 3 wherein the wheel rim 42 is now approximately 3 inches above the conveyor elements 20. The lowering of the wheel and tire permits engaging of the tire bead 50 and wheel rim 44, FIG. 3. However, during such lowering the lost motion connection between the wheel rim seal ring 86 and seal support carriage 56 due to the hanger pins 88 being vertically movable within the holes 90 assures that the sealed relationship between the seal ring 86 and wheel rim 44 continues during the lattermost stages of inflation and thereby insuring that a consistent predetermined air pressure will be present in each inflated tire. Also, this lost motion support of the seal ring 86 minimizes the amount of air required for inflation as no air is lost during the downward movement of the wheel and tire.

After inflation has been completed, the air bag 34 is exhausted of compressed air to lower the platform 36 to replace the wheel 40 upon the moving conveyor elements 20, and the seated and inflated wheel and tire proceed to the next conveyor station.

With the practice of the invention it is preferred to seat and inflate tires without stopping movement of the conveyor. For instance, when the tires are sufficiently spaced apart on the conveyor a wheel and tire may be lifted from the conveyor to the seal rings 68 and 86, inflated, and replaced upon the conveyor prior to the subsequent wheel and tire arriving at the seating and inflating station. Further, the disclosed arrangement provides greater seal life than previously known bead seating apparatus, and the efficiency of air utilization is high.

It is appreciated that various modifications to the inventive concept may be apparent to those skilled in the art without departing from the spirit and scope thereof.

We claim:

1. Apparatus for seating tubeless tires having sidewalls and beads upon rimmed wheels comprising, in combination, a vertically extending frame having upper and lower regions, wheel elevating means mounted upon said frame lower region for vertically elevating a horizontally disposed wheel from a lower initial position to an elevated position, seal support means mounted upon said frame upper region above said wheel elevating means, an annular sidewall seal ring mounted upon said seal support means in fixed relation thereto, said ring including an annular free lower edge adapted to sealingly engage a tire sidewall, an annular wheel rim seal ring mounted upon said seal support means within said sidewall seal ring, lost motion means mounting said wheel rim seal ring on said support means permitting relative limited vertical displacement thereon, annular sealing means defined upon said wheel rim seal ring sealingly engaging a wheel upper rim when a wheel is in an elevated position, an annular chamber defined by said sidewall and wheel rim seal rings, compressed air supply means communicating with said chamber, said wheel elevating means including compressible means maintaining an elevating force on the elevated wheel less than the downward force exerted on the tire sidewall during completion of inflation of a tire due to engagement of the sidewall seal ring with the tire sidewall whereby said wheel and tire are lowered during tire inflation and said lost motion means maintains a seal between the wheel rim and wheel rim seal ring during such wheel and tire lowering.

2. Apparatus for seating tubeless tires as in claim 1 wherein said lost motion means comprises vertically disposed hangers having a lower end fixed to said wheel rim seal ring and an upper end vertically slidably positionable with respect to said seal support means.

3. Apparatus for seating tubeless tires as in claim 2, a base plate mounted upon said seal support means, a plurality of holes defined in said base plate, a hanger slidably received within each hole, and a vertically adjustable abutment head defined upon each of said hangers engaging said base plate adjacent the associated hole at the lowermost position of said wheel rim seal ring with respect to said seal support means.

4. Apparatus for seating tubeless tires as in claim 1, spring means mounted on said seal support means biasing said wheel rim seal ring downwardly to maintain a sealed relationship with a wheel rim raised into engagement therewith.

5. Apparatus for seating tubeless tires as in claim 3, compression spring means circumscribing a plurality of said hangers intermediate said base plate and said wheel rim seal ring biasing said wheel rim seal ring downwardly to maintain a sealed relationship with a wheel rim raised into engagement therewith.

6. Apparatus for seating tubeless tires as in claim 1, vertically disposed guide means defined on said frame upper region, said seal support means being mounted upon said guide means for vertical adjustment thereon, and seal support means adjustment means mounted on said frame for vertically positioning said seal support means.

7. Apparatus for seating tubeless tires as in claim 6 wherein said adjustment means comprise an expansible motor.

8. Apparatus for seating tubeless tires as in claim 1 wherein said wheel elevating means comprises an air operated expansible motor.

* * * * *